(12) United States Patent
Tai et al.

(10) Patent No.: US 10,703,477 B2
(45) Date of Patent: Jul. 7, 2020

(54) UAV, SYSTEM AND METHOD FOR DETERMINING LANDING STATUS OF UAV

(71) Applicant: Industrial Technology Research Institute, Hsin-Chu (TW)

(72) Inventors: Yuan-Chu Tai, Hsinchu (TW); Yi-Lun Wen, Taoyuan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 301 days.

(21) Appl. No.: 15/831,939

(22) Filed: Dec. 5, 2017

(65) Prior Publication Data

US 2019/0061940 A1    Feb. 28, 2019

(30) Foreign Application Priority Data

Aug. 29, 2017    (TW) .............................. 106129376 A

(51) Int. Cl.
*B64C 39/02*    (2006.01)
(52) U.S. Cl.
CPC ...... *B64C 39/024* (2013.01); *B64C 2201/141* (2013.01); *B64C 2201/18* (2013.01)
(58) Field of Classification Search
CPC ..................... B64C 39/024; B64C 2201/141
See application file for complete search history.

(56) References Cited

U.S. PATENT DOCUMENTS

| 4,995,722 A | 2/1991 | Sutour |
| 7,195,200 B2 | 3/2007 | Yamane |
| 8,068,950 B2 | 11/2011 | Duggan et al. |
| 8,554,395 B2 | 10/2013 | Andersson |
| 8,630,755 B2 | 1/2014 | Ohtomo et al. |

(Continued)

FOREIGN PATENT DOCUMENTS

| CN | 105204521 A | 12/2015 |
| CN | 105818966 A | 8/2016 |

(Continued)

OTHER PUBLICATIONS

Boskovic et al. "An autonomous carrier landing system forunmannned aerial vehicles". Aug. 2009, American Institute of Aeronautics and Astronautics, Chicago, Illinois, USA.

(Continued)

*Primary Examiner* — Jess Whittington
(74) *Attorney, Agent, or Firm* — WPAT, PC

(57) ABSTRACT

An unmanned aerial vehicle (UAV), a system and a method for determining a landing status of the UAV are provided. The UAV system includes a UAV, a landing surface and a processing unit. The UAV has a landing gear furnished with a plurality of sensors. The landing surface is provided for the UAV to land thereon. The processing unit, coupled electrically with the plurality of sensors, is to determine, while the UAV is landing towards the landing surface, either whether or not a number of the plurality of sensors that have touched the landing surface at least once within a touch-judging time is not less than a predetermined touch-judging number, or whether or not a number of the plurality of sensors that contact the landing surface synchronously within a land-judging time is not less than a predetermined land-judging number.

14 Claims, 5 Drawing Sheets

(56) References Cited

U.S. PATENT DOCUMENTS

| | | | |
|---|---|---|---|
| 9,169,031 | B2 | 10/2015 | Laks et al. |
| 9,499,265 | B2 | 11/2016 | Sanz et al. |
| 9,540,121 | B2 | 1/2017 | Byers et al. |
| 2013/0325221 | A1* | 12/2013 | Shue ............... B64C 13/04 701/16 |
| 2015/0051758 | A1 | 2/2015 | Cho |
| 2016/0009413 | A1 | 1/2016 | Lee et al. |
| 2016/0068264 | A1* | 3/2016 | Ganesh ............ G01S 19/42 701/2 |
| 2016/0272308 | A1* | 9/2016 | Gentry ............. B64C 25/001 |
| 2016/0376031 | A1* | 12/2016 | Michalski ........ G08G 5/0026 701/15 |
| 2017/0050749 | A1 | 2/2017 | Pilskalns |
| 2017/0139045 | A1* | 5/2017 | Cherepinsky ...... B64D 45/0005 |
| 2017/0322069 | A1* | 11/2017 | Mastrianni ........ G01G 19/12 |
| 2018/0237161 | A1* | 8/2018 | Minnick ............ B64F 1/007 |
| 2019/0120684 | A1* | 4/2019 | Oren ................. G01G 19/07 |

FOREIGN PATENT DOCUMENTS

| | | |
|---|---|---|
| CN | 205418076 U | 8/2016 |
| CN | 106005377 | 10/2016 |
| CN | 106103281 A | 11/2016 |
| CN | 106715265 A | 5/2017 |
| CN | 206537499 U | 10/2017 |
| JP | 2015145784 A | 8/2015 |
| JP | 2017102942 A | 6/2017 |
| TW | 201704099 A | 2/2017 |
| TW | 201711916 A | 4/2017 |

OTHER PUBLICATIONS

Merz et al. "Autonomous landing of an unmanned helicopter based on vision and inertial sensing", Mar. 9, 2006, Department of Computer and Information Science Linköping University, SE-58183 Linköping, Sweden.

McIngvale, "Universal automatic landing system for remote piloted vehicles", Apr. 4, 1989, USPTO, USA.

Saripalli et al. "Landing a helicopter on a moving target", Apr. 10, 2007, 2007 IEEE International Conference on Robotics and Automation, Roma, Italy.

Herisse et al. "Landing a VTOL unmanned aerial vehicle on a moving platform using optical flow", Feb. 2012, IEEE Transactions on Robotics, vol. 28, No. 1.

Saripallie et al. "Visually guided landing of an unmanned aerial vehicle" Jun. 2003, IEEE Transactions on Robotics and Automation, vol. 19, No. 3.

* cited by examiner

UAV, SYSTEM AND METHOD FOR DETERMINING LANDING STATUS OF UAV

CROSS REFERENCE TO RELATED APPLICATION

This application also claims priority to Taiwan Patent Application No. 106129376 filed in the Taiwan Patent Office on Aug. 29, 2017, the entire content of which is incorporated herein by reference.

TECHNICAL FIELD

The disclosure relates to an unmanned aerial vehicle (UAV), system and method for determining a landing status of a UAV.

BACKGROUND

Generally, conditions that adversely affect a UAV to land safely and properly could be various and occur unexpectedly. For example, the UAV may lose its balance and even tip over while in landing on a rough ground. In another example, while the UAV is to land on a platform, it may run over an edge of the platform and then tip to fall if one landing gear of the UAV couldn't stand on the platform properly.

Hence, there is definitely a need for a system and method capable of evaluating the instant landing status of the UAV so as thereby to determine further whether or not the UAV can land properly and safely.

SUMMARY

Accordingly, in one embodiment of the disclosure, an unmanned aerial vehicle (UAV) system for determining a landing status of a UAV includes a UAV, a landing surface, and a processing unit. The UAV has a landing gear furnished with a plurality of sensors. The landing surface is provided for the UAV to land thereon. The processing unit, coupled electrically with the plurality of sensors, is to determine, while the UAV is landing towards the landing surface, either whether or not a number of the plurality of sensors that have touched the landing surface at least once within a touch-judging time is not less than a predetermined touch-judging number, or whether or not a number of the plurality of sensors that contact the landing surface synchronously within a land-judging time is not less than a predetermined land-judging number.

In one embodiment of the disclosure, an unmanned aerial vehicle (UAV) includes a landing gear, a plurality of sensors, and a processing unit. The plurality of sensors are furnished to the landing gear. The processing unit, coupled electrically with the plurality of sensors, is to determine, while the UAV is landing onto the landing surface, either whether or not a number of the plurality of sensors that have touched the landing surface at least once within a touch-judging time is not less than a predetermined touch-judging number, or whether or not a number of the plurality of sensors that contact the landing surface synchronously within a land-judging time is not less than a predetermined land-judging number.

In one embodiment of the disclosure, an unmanned aerial vehicle (UAV) method for determining a landing status of a UAV includes a step of landing the UAV towards a landing surface, wherein the UAV has a landing gear furnished thereon with a plurality of sensors; and, a step of determining whether or not the UAV has landed completely on the landing surface by judging if or not a number of sensors out of the plurality of sensors that touch the landing surface at least once within a touch-judging time is not less than a predetermined touch-judging number.

In one embodiment of the disclosure, an unmanned aerial vehicle (UAV) method for determining a landing status of a UAV includes a step of landing the UAV towards a landing surface, wherein the UAV has a landing gear furnished thereon with a plurality of sensors; and, a step of determining whether or not the UAV has landed completely on the landing surface by judging if or not a number of sensors out of the plurality of sensors that touch the landing surface synchronously within a land-judging time is not less than a predetermined land-judging number.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
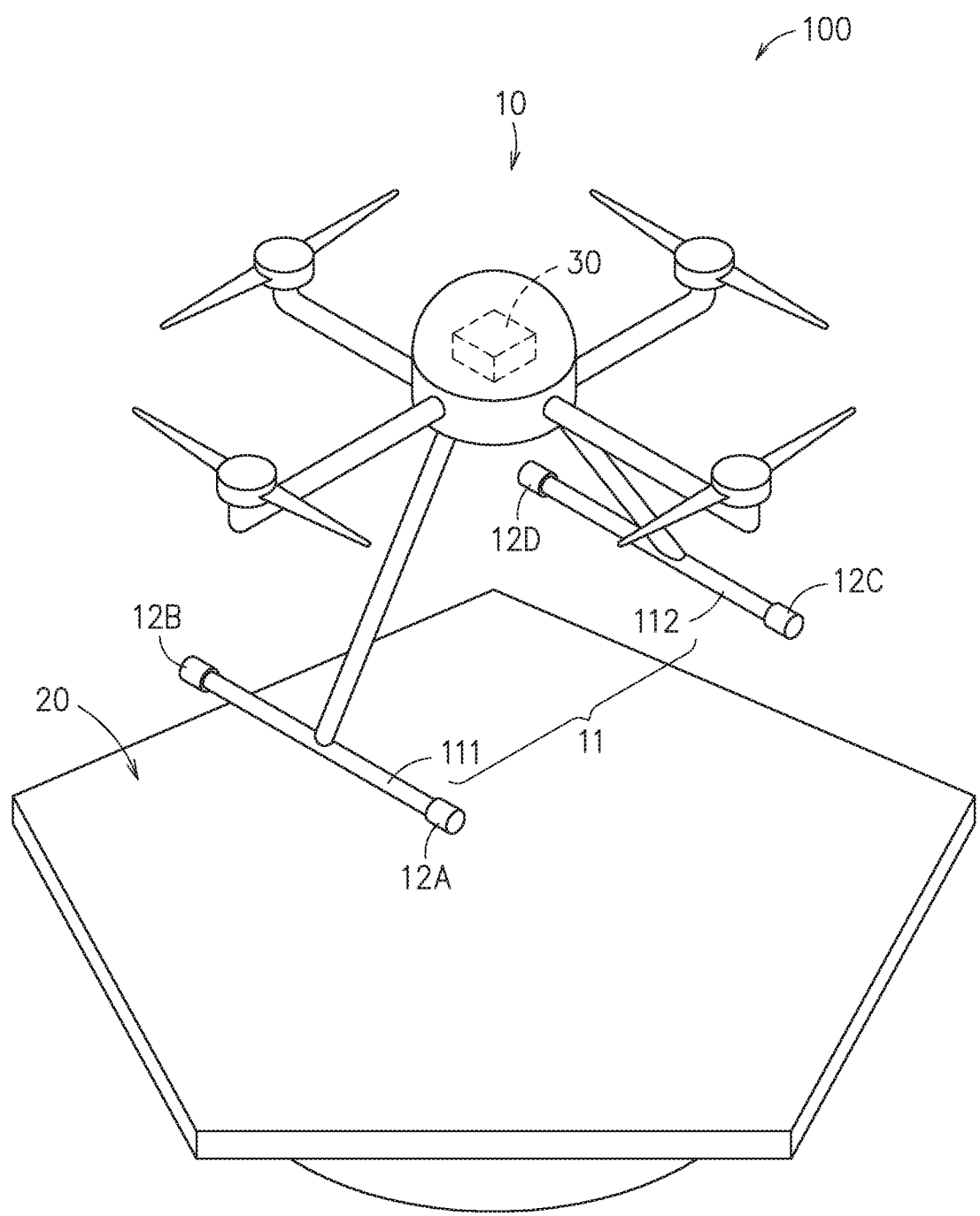
FIG. 1 is a schematic perspective view of a preferred embodiment of the aerial vehicle (UAV) system for determining a landing status of a UAV in accordance with the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in the embodiment of FIG. 1, an unmanned aerial vehicle (UAV) system 100 for determining a landing status of a UAV includes a UAV 10, a landing surface 20 and a processing unit 30.

The UAV 10 has a landing gear 11 furnished with a plurality of sensors 12A~12D (four shown in the figure). In this embodiment, the landing gear 11 includes, but not limited to, a first rack 111 and a second rack 112, arranged substantially in parallel with each other and each of which is formed as a long slim bar. As shown, the sensors 12A and 12B are disposed axially at two opposing ends of the first rack 111, while the sensors 12C and 12D are disposed axially at two opposing ends of the second rack 112. It is noted that, in some other exemplary examples, other relevant arrangements of the racks and the sensors are also acceptable. For example, in one example, the degree of parallelism between the two racks is not strictly demanded, and the number of the sensors is not limited to four. In another example, each end of the first or second rack may be furnished with two sensors. Practically, the number of sensors at each individual end of the rack can be various, but according to instant requirements. Also, the sensors are not necessary to dispose at ends of the racks. In the disclosure, each of the sensors 12A~12D can be a mechanical detector such as a touch switch, a micro switch or the like, or any electronic detector.

The landing surface 20 for the UAV 10 to land thereon can be a ground surface, a landing platform, or a charging platform. In this embodiment, the landing surface 20 is a landing platform entirely, with or without recharge-ability. In another embodiment, the landing surface 20 can be a grid surface or a surface with plural holes.

In one exemplary example, the sensors 12A~12D can be electronic detectors, such as conductors, metals or the like. Also, the landing surface 20 can be made of a conductive material (e.g. metal), such that, as any, part or all of the sensors 12A~12D contact the landing surface 20, the detection of any change in current and/or voltage would then be used to realize the contact state between the sensors 12A~12D and the landing surface 20. In this instance, the electronic detector can be a charging electrode, and the landing surface 20 can be built to provide a charging voltage the electronic detector. Upon such an arrangement, the UAV 10 can be charged by the landing surface 20 if any of the aforesaid contact therebetween is real.

The processing unit 30, coupled electrically with to the sensors 12A~12D, can be a processor, a microprocessor, a digital signal processor (DSP), an application-specific integrated circuit (ASIC) or the like. The processing unit 30 is used for determining, while the UAV 10 is landing towards the landing surface 20, either (1) whether or not a number of the sensors (out of the plurality of the sensors 12A~12D) that touch the landing surface 20 at least once within a touch-judging time is not less than a predetermined touch-judging number, or (2) whether or not a number of the sensors (out of the plurality of the sensors 12A~12D) that contact the landing surface 20 synchronously within a land-judging time is not less than a predetermined land-judging number. In this disclosure, various ways can be applied to install the processing unit 30. For example, in this embodiment, the processing unit 30 is mounted on the UAV 10 and coupled with the sensors 12A~12D in a wiring or wireless manner. In another embodiment not shown here, the processing unit 30 can be disposed on a landing surface or platform or at a distant location but being coupled electrically to the landing surface 20. In addition, in the case that the sensors 12A~12D are electronic detectors, the variation of currents and/or voltages on the landing surface 20 can be detected such that the contacting relationship between the sensors 12A~12D and the landing surface 20 can be determined by the processing unit 30.

Figure 2:
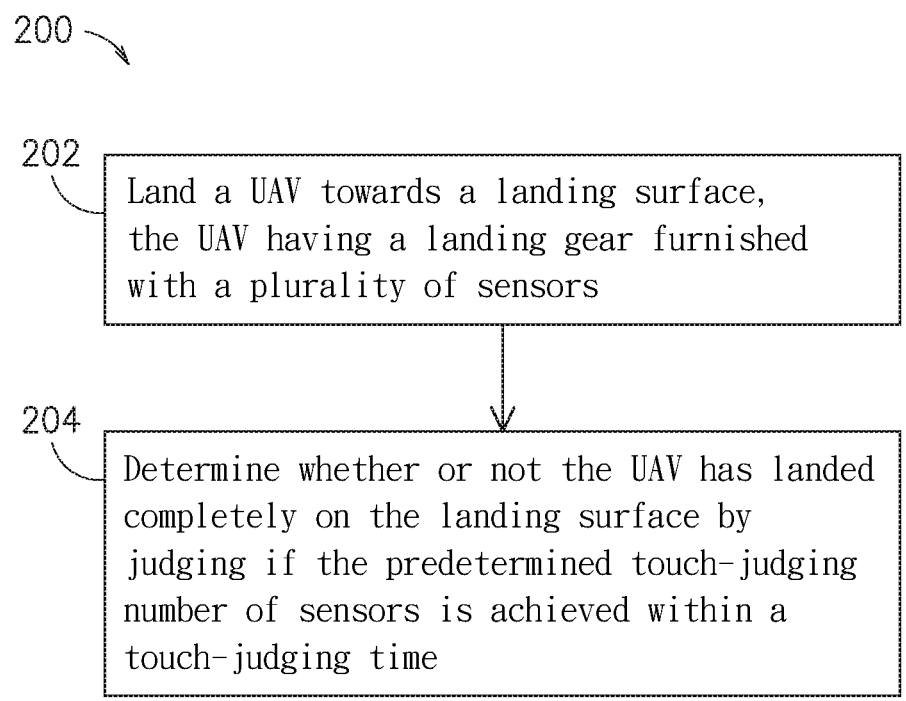
FIG. 2 is a flowchart of a preferred embodiment of the UAV method for determining a landing status of a UAV in accordance with the disclosure.

Refer now to FIG. 1 and FIG. 2, in which FIG. 2 is a flowchart of a preferred embodiment of the UAV method for determining a landing status of a UAV in accordance with the disclosure. The method 200 shown in FIG. 2 includes following two steps.

Step 202: Land the UAV 10 towards the landing surface 20, in which the UAV 10 has a landing gear 11 furnished thereon with a plurality of sensors 12A~12D.

Step 204: Determine whether or not the UAV 10 has landed completely on the landing surface 20 by judging if the predetermined touch-judging number of sensors out of the sensors 12A~12D has been achieved within a touch-judging time. In one embodiment of the disclosure, a sensor entitled to contribute to the predetermined touch-judging number is because this sensor touches the landing surface 20 at least once within the touch-judging time.

Figure 3:
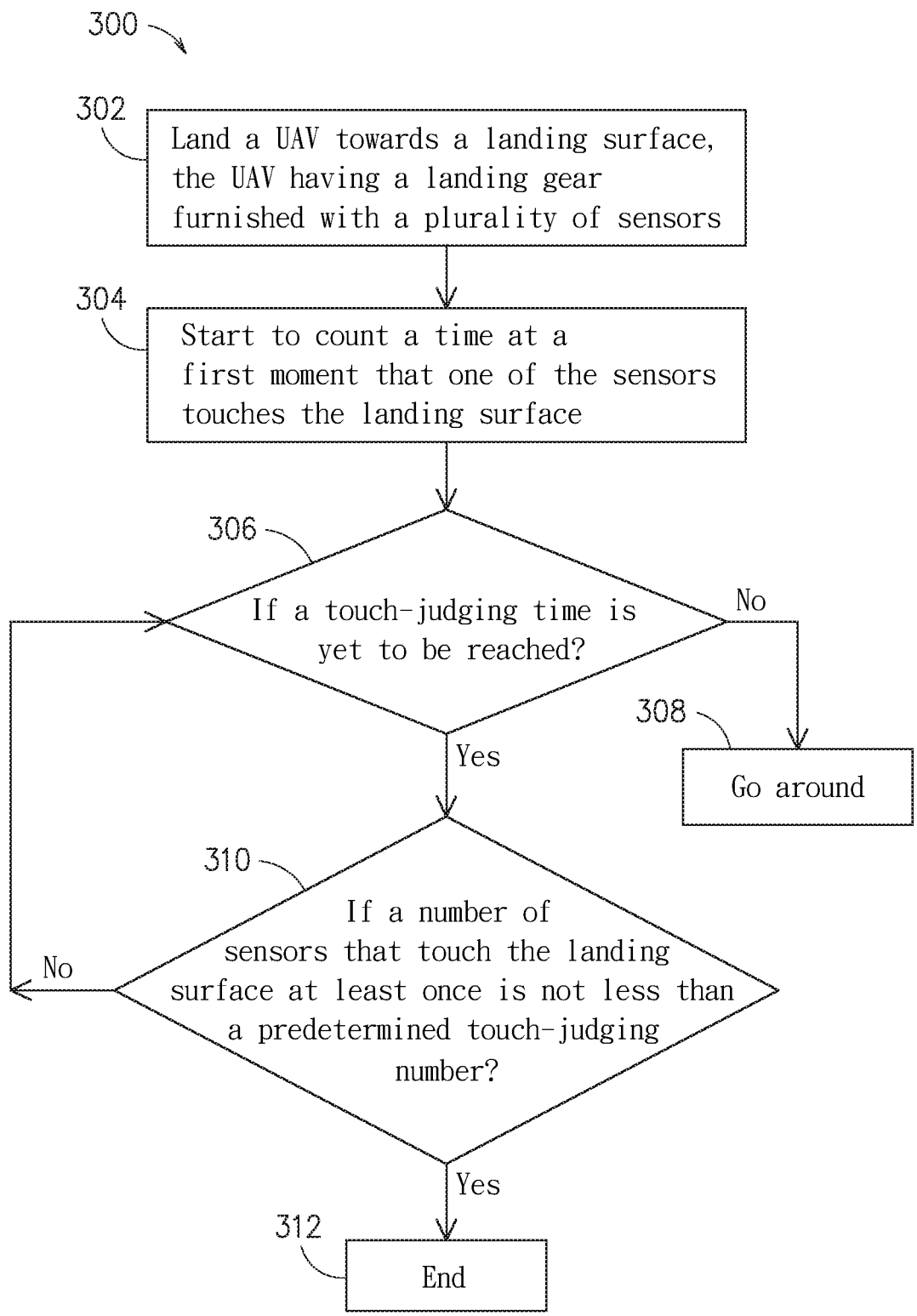
FIG. 3 is a flowchart of another embodiment of the UAV method for determining a landing status of a UAV in accordance with the disclosure.

Refer now to FIG. 1 and FIG. 3, in which FIG. 3 is a flowchart of another embodiment of the UAV method for determining a landing status of a UAV in accordance with the disclosure. The method 300 shown in FIG. 3 includes the following steps.

Step 302: Land the UAV 10 towards the landing surface 20, in which the UAV 10 has a landing gear 11 furnished thereon with a plurality of sensors 12A~12D.

Step 304: Start to count a time at a first moment that one of the sensors 12A~12D touches the landing surface 20. As shown in FIG. 1, since the sensors 12A~12D are all coupled electrically to the processing unit 30, thus the processing unit 30 would be triggered to count the time upon when any of the sensors 12A~12D touches the landing surface 20.

Step 306: Determine whether or not a touch-judging time is yet to be reached. the decision that the touch-judging time is reached may be that the counted time equals or exceeds the touch-judging time. In the case that the touch-judging time is reached, then the method 300 goes to perform Step 308 for a go-around. After the go-around is performed, the method 300 may decide if landing the UAV 10 again; for example, to perform Step 302 for a new landing process. Alternatively, the UAV 10 may be rearranged to land towards another surface. On the other hand, in the case that the touch-judging time is yet to be reached, then the method 300 goes to perform Step 310. In this disclosure, the touch-judging time is determined according to practical requirements. For example, the touch-judging time can be set to be 0.2 seconds.

Step 310: Determine whether or not a number of the sensors (out of the plurality of the sensors 12A~12D) that have touched the landing surface 20 at least once within the touch-judging time is not less than a predetermined touch-judging number. For example, it is to determine if or not the number of the sensors that have touched the landings surface 20 at least once before the completion of the touch-judging time equals or exceeds the predetermined touch-judging number. If negative, the method 300 goes back to perform Step 306. Otherwise, i.e. if positive, the method 300 proceeds to perform Step 312 of ending the landing process. In this disclosure, the judgment upon the number of the sensors that that have touched the landing surface 20 at least once within the touch-judging time can be realized practically and equivalently to determine a percentage of the number of these qualified sensors out of the plurality of the sensors 12A~12D. For example, the foregoing predetermined touch-judging number can be set to be 75%. Namely, for the UAV system having four sensors, the judgment at Step 310 would be positive if at least three of the sensors have ever touched the landing surface 20. In some other exemplary embodiments, the predetermined touch-judging number may be set to be 50% or 100%, any of which may be determined by evaluating positions and/or the total number of the sensors of the UAV system.

By practicing the embodiment shown in FIG. 3, a landing process is firstly started when an UAV 10 is controlled to land towards the landing surface 20 (Step 302). Then, as soon as the sensor 12A touches the landing surface 20, a clock of the processing unit 30 starts to count (Step 304). In Step 306, if the time counting of the clock reaches 0.2 seconds, a go-around would be performed (Step 308). Otherwise (i.e., the time counting of the clock is less than 0.2 seconds), Step 310 is performed. In Step 310, if the predetermined touch-judging number in percentage does not reach 75%, then the method 300 proceeds back to perform Steps 306 and 310 till the time counting of the clock reaches 0.2 seconds, or till any three of the sensors have touched the landing surface 20 at least once within this 0.2 seconds. In the latter situation, a possible scenery may be that: after the first contact of the sensor 12A at the landing surface 20 (i.e., the onset of the clock counting), the sensor 12B contacts the landing surface 20 at 0.1 seconds; and, at 0.15 seconds, the sensor 12C contacts the landing surface 20, but the sensor 12A loses its contact with the landing surface 20 due to a possible bouncing back. It is noted that, for the aforesaid scenery, the judgment of Step 310 would be still positive to confirm that three out of these four sensors 12A~12D have already touched the landing surface 20, and thus the landing process is determined to be completed.

In this embodiment, by defining a complete-landed state of the UAV system in terms of a certain percentage of the sensors on the UAV 10 to fulfill at least one contact with the landing surface 20 within the preset touch-judging time, a landing failure of possible UAVs tip-over due to a portion of landing gear 11 (25% or 50% for example) being hung over the landing surface 20 can be forbidden, and a fault go-around call from inevitable bouncing or the like occasion happened to the UAV 10 during the landing process can be also prevented. In this disclosure, if the touch-judging time is set too long, the risk of landing failure or tip-over would be escalated. On the other hand, if the touch-judging time is set too short, the UAV 10 may face frequent and unnecessary go-around.

Figure 4:
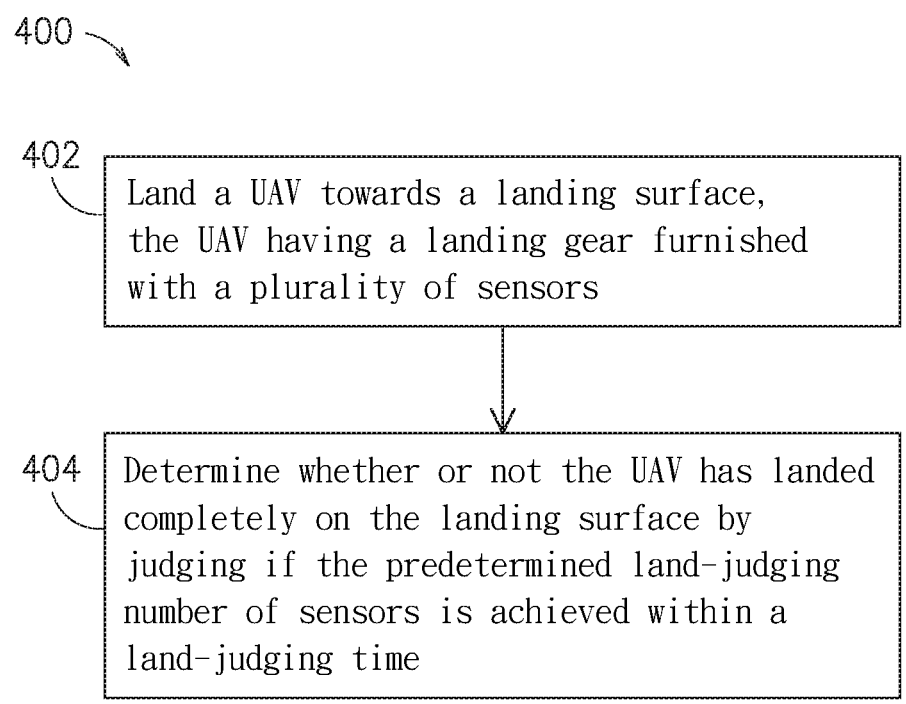
FIG. 4 is a flowchart of a further embodiment of the UAV method for determining a landing status of a UAV in accordance with the disclosure.

Refer now to FIG. 1 and FIG. 4, in which FIG. 4 is a flowchart of a further embodiment of the UAV method for determining a landing status of a UAV in accordance with the disclosure. The method 400 includes the following steps.

Step 402: Land the UAV 10 towards the landing surface 20, in which the UAV 10 has a landing gear 11 furnished thereon with a plurality of sensors 12A~12D.

Step 404: Determine whether or not the UAV 10 has landed completely on the landing surface 20 by judging if the predetermined land-judging number related to the sensors 12A~12D has been achieved within a land-judging time. In one embodiment of the disclosure, a sensor is entitled to contribute to the predetermined land-judging number is because this sensor is one of the sensors that contact the landing surface 20 synchronously within the land-judging time.

Figure 5:
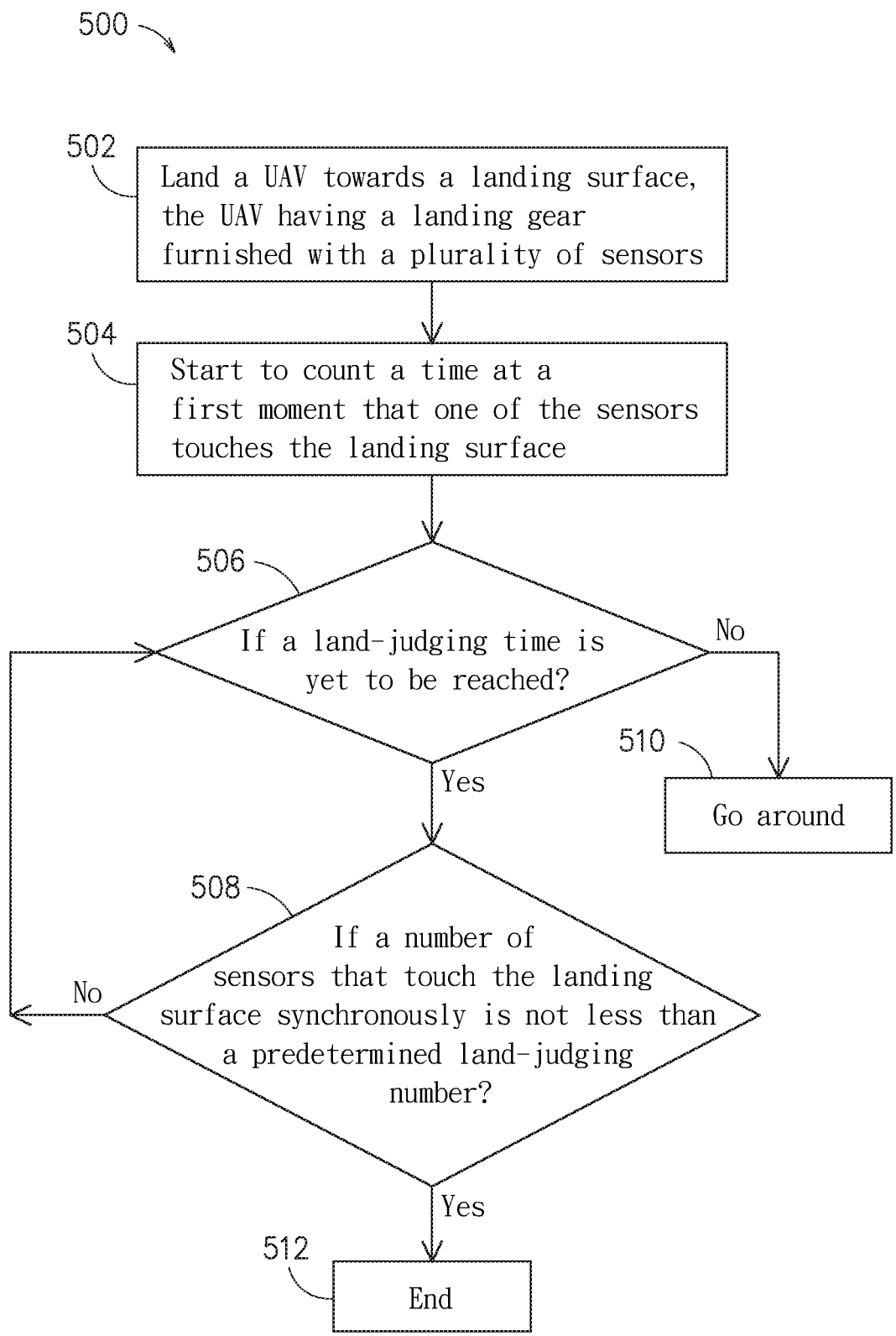
FIG. 5 is a flowchart of further one more embodiment of the UAV method for determining a landing status of a UAV in accordance with the disclosure.

Refer now to FIG. 1 and FIG. 5, in which FIG. 5 is a flowchart of further one more embodiment of the UAV method for determining a landing status of a UAV in accordance with the disclosure. The method 500 shown in FIG. 5 includes the following steps.

Step 502: Land the UAV 10 towards the landing surface 20, in which the UAV 10 has a landing gear 11 furnished thereon with a plurality of sensors 12A~12D.

Step 504: Start to count a time at a first moment that one of the sensors 12A~12D touches the landing surface 20. As shown in FIG. 1, since the sensors 12A~12D are all coupled electrically to the processing unit 30, thus the processing unit 30 may be triggered to count the time upon when any of the sensors 12A~12D touches the landing surface 20.

Step 506: Determine whether or not a land-judging time is yet to be reached. The decision that the land-judging time is reached may be that the counted time equals or exceeds the land-judging time. In the case that the land-judging time is not reached, then the method 500 goes to perform Step 508. On the other hand, in the case that the land-judging time is reached, then the method 500 goes to perform Step 510 for a go-around. After the go-around is performed, the method 500 may decide if landing the UAV 10 again; for example, to perform Step 502 for a new landing process. Alternatively, the UAV 10 may be rearranged to land towards another surface. In this disclosure, the land-judging time is determined according to practical requirements. For example, the land-judging time can be set to be 2 seconds.

Step 508: Determine whether or not a number of the sensors (out of the plurality of the sensors 12A~12D) that touch the landing surface 20 synchronously within the land-judging time is not less than a predetermined land-judging number. Namely, in this disclosure, it is to determine if or not the number of the sensors that touch the landings surface 20 synchronously before the completion of the land-judging time equals or exceeds the predetermined land-judging number. If negative, the method 500 goes back to perform Step 506. Otherwise, i.e. if positive, the method 500 proceeds to perform Step 512 of ending the landing process. In this disclosure, the judgment upon the number of the sensors that that touch the landing surface 20 synchronously within the land-judging time can be realized practically and equivalently to determine a percentage of the number of these qualified sensors out of the plurality of the sensors 12A~12D. For example, the foregoing predetermined land-judging number can be set to be 75%. Namely, for the UAV system having four sensors, the judgment at Step 508 would be positive if at least three of the sensors contact the landing surface 20 at the same time. In some other exemplary embodiments, the predetermined land-judging number may be set to be 50% or 100%, any of which may be determined by evaluating positions and/or the total number of the sensors of the UAV system.

By practicing the embodiment shown in FIG. 5, a landing process is firstly started when an UAV 10 is controlled to land towards the landing surface 20 (Step 502). Then, as soon as the sensor 12A touches the landing surface 20, a clock of the processing unit 30 starts to count (Step 504). In Step 506, if the time counting of the clock reaches 2 seconds, a go-around would be performed (Step 510). Otherwise (i.e., the time counting of the clock is less than 2 seconds), Step 508 is performed. In Step 508, if the percentage of the sensors that contact the landing surface 20 synchronously is not less than the predetermined land-judging number (75% for example), then the method 500 proceeds Step 512, and the landing process is determined to be completed. However, if the percentage of the sensors that contact the landing surface 20 synchronously is less than 75%, then the method 500 goes back to perform Step 506. In a demonstrative example, after the first contact of the sensor 12A at the landing surface 20 (i.e., the onset of the clock counting), the sensor 12B contacts the landing surface 20 at 0.1 seconds; and, at 0.15 seconds, the sensor 12C contacts the landing surface 20, but the sensor 12A loses its contact with the landing surface 20 due to a possible bouncing back. It is noted that, at this moment of 0.15 seconds, the two sensors 12B and 12C still make contact at the landing surface 20, the sensor 12A leaves the landing surface 30, and the sensor 12D is yet to contact the landing surface 20. Namely, at 0.15 seconds, only 50% of the sensors 12A~12D contact synchronously at the landing surface 20, which is less than the predetermined land-judging number in percentage (75%). Hence, at 0.15 seconds, Step 508 will determine the method 500 to go back to Step 506 for further judging if or not the time is counted to the 2 seconds, the land-judging time.

The aforesaid steps can be used to determine whether or not the UAV 10 is properly landed, by detecting if a certain percentage of the sensors contacting at the landing surface 20 synchronously equals or exceeds the predetermined land-judging number in percentage or not. If positive, the UAV 10 is determined to land properly on the landing surface 20.

In practicing the methods of the disclosure, the embodiment shown in FIG. 3 and that shown in FIG. 5 can be performed independently in landing the UAV 10. Namely, by fulfilling steps either in the flowchart of FIG. 3 or in that of FIG. 5, the landing process can be determined to be completed. However, in an exemplary embodiment of the disclosure, steps of FIG. 3 and those of FIG. 5 can be performed simultaneously or orderly. While in performing the steps of FIG. 3 and those of FIG. 5 simultaneously, the landing process can be determined to be completed only if both judgments upon the landing (Steps 310 and 508) are positive. In another exemplary embodiment, the landing process can be formed by performing the steps of FIG. 3 first and then those of FIG. 4. Only after the entire flowchart of FIG. 4 is fulfilled, the landing process can then be determined to be completed. In a further exemplary embodiment, the landing process can be performed by merging the steps of FIG. 3 with those of FIG. 5. For example, Step 302 and Step 502 can be integrated as a single step, and Step 304 and Step 504 can be integrated as another single step. In addition, Steps 306, 310 and 308 can be can be performed in parallel with Step 506, 508 and 510. Thus, the landing process is determined to be completed upon both criteria defined by the predetermined touch-judging number (or in percentage) and the predetermined land-judging number (or in percentage) are met.

To sum up, in the unmanned aerial vehicle (UAV) system and method for determining a landing status of a UAV provided by embodiments of the disclosure, a plurality of sensors are furnished to the landing gear of the UAV. By applying these sensors to detect the corresponding contact statuses with the landing surface (such as the ground, a landing platform, a charging surface or the like), the instant landing status of the UAV can be immediately realized. Hence, by judging the complete-landed state defined to the UAV, possible tip-over caused by a balance loss of the UAV during the landing process can be effectively avoided.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An unmanned aerial vehicle (UAV) system for determining a landing status of a UAV, comprising:
the UAV, having a landing gear furnished with a plurality of sensors;
a landing surface, provided for the UAV to land thereon; and
a processing unit, coupled electrically with the plurality of sensors, being configured to determine, while the UAV is landing towards the landing surface, whether a number of the plurality of sensors that contact the landing surface synchronously within a land-judging time is greater than or equal to a predetermined land-judging number, wherein determining whether the number of the plurality of sensors that contact the landing surface synchronously within the land-judging time is greater than or equal to the predetermined land-judging number comprises:
starting to count a time at a first moment that one of the plurality of sensors touches the landing surface; and
determining whether the land-judging time is reached;
wherein if the land-judging time is not yet reached, determining whether the number of sensors out of the plurality of sensors that touch the landing surface synchronously is greater than or equal to the predetermined land-judging number; and
if the number of sensors out of the plurality of sensors that touch the landing surface synchronously is greater than or equal to the predetermined land-judging number, then determining that the UAV is landed.

2. The UAV system of claim 1, wherein each of the plurality of sensors is one of a mechanical detector and an electronic detector.

3. The UAV system of claim 1, wherein at least one of the plurality of sensors is an electronic detector, the electronic detector is a conductor, and the landing surface is made of a conductive material; wherein, while the electronic detector contacts the landing surface, the processing unit detects variations in current or voltage to determine whether the electronic detector touches the landing surface.

4. The UAV system of claim 3, wherein the electronic detector is a charging electrode for the landing surface to charge the UAV landing on the landing surface.

5. An unmanned aerial vehicle (UAV), comprising:
a landing gear;
a plurality of sensors, furnished to the landing gear; and
a processing unit, coupled electrically with the plurality of sensors, being configured to determine, while the UAV is landing towards a landing surface, whether a number of the plurality of sensors that contact the landing surface synchronously within a land-judging time is greater than or equal to a predetermined land-judging number, wherein determining whether the number of the plurality of sensors that contact the landing surface synchronously within the land-judging time is greater than or equal to the predetermined land-judging number comprises:
starting to count a time at a first moment that one of the plurality of sensors touches the landing surface; and
determining whether the land-judging time is reached;
wherein if the land-judging time is not yet reached, determining whether the number of sensors out of the plurality of sensors that touch the landing surface synchronously is greater than or equal to the predetermined land-judging number; and
if the number of sensors out of the plurality of sensors that touch the landing surface synchronously is greater than or equal to the predetermined land-judging number, then determining that the UAV is landed.

6. The UAV of claim 5, wherein each of the plurality of sensors is one of a mechanical detector and an electronic detector.

7. The UAV of claim 5, wherein at least one of the plurality of sensors is an electronic detector, the electronic detector is a conductor, and the landing surface is made of a conductive material; wherein, while the electronic detector contacts the landing surface, the processing unit detects variations in current or voltage to determine whether the electronic detector touches the landing surface.

8. The UAV of claim 7, wherein the electronic detector is a charging electrode for the landing surface to charge the UAV landing on the landing surface.

9. An unmanned aerial vehicle (UAV) method for determining a landing status of a UAV, comprising:
    landing the UAV towards a landing surface, wherein the UAV has a landing gear furnished thereon with a plurality of sensors;
    determining whether the UAV has landed completely on the landing surface by judging if a number of sensors out of the plurality of sensors that touch the landing surface synchronously within a land-judging time is greater than or equal to a predetermined land-judging number;
    wherein determining whether the UAV has landed completely on the landing surface comprises:
        starting to count a time at a first moment that one of the plurality of sensors touches the landing surface; and
        determining whether the land-judging time is reached;
        wherein if the land-judging time is not yet reached, determining whether the number of sensors out of the plurality of sensors that touch the landing surface synchronously is greater than or equal to the predetermined land-judging number; and
        if the number of sensors out of the plurality of sensors that touch the landing surface synchronously is greater than or equal to the predetermined land-judging number, then determining that the UAV is landed.

10. The UAV method of claim 9, wherein determining whether the UAV has landed completely on the landing surface further comprises:
    having the UAV to go around if the land-judging time is reached.

11. The UAV method of claim 9, wherein determining whether the UAV has landed completely on the landing surface further comprises:
    if the number of sensors out of the plurality of sensors that touch the landing surface synchronously is less than the predetermined land-judging number, determining again whether the land-judging time is reached.

12. The UAV method of claim 9, wherein each of the plurality of sensors is one of a mechanical detector and an electronic detector.

13. The UAV method of claim 9, wherein at least one of the plurality of sensors is an electronic detector, the electronic detector is a conductor, and the landing surface is made of a conductive material; wherein, while the electronic detector contacts the landing surface, a processing unit detects variations in current or voltage so as to determine whether the electronic detector touches the landing surface.

14. The UAV method of claim 12, wherein the electronic detector is a charging electrode for the landing surface to charge the UAV landing on the landing surface.

* * * * *